United States Patent [19]
Meng

[11] Patent Number: 5,653,852
[45] Date of Patent: Aug. 5, 1997

[54] DISTILLING DEVICE

[76] Inventor: Ching Ping Meng, No. 38, Lane 207, Chung Hsiao Street, Yung Kang Shih, Tainan Hsien, Taiwan

[21] Appl. No.: 555,145

[22] Filed: Nov. 8, 1995

[51] Int. Cl.$^6$ ............................................. B01D 3/00
[52] U.S. Cl. .................. 202/236; 159/28.6; 159/900; 203/10; 203/100
[58] Field of Search .................. 203/10, 100, 90; 159/481, 900, 3, 28.6; 165/69; 202/185.1, 236, 202, 197, 175; 239/589.1; 55/277

[56] References Cited

U.S. PATENT DOCUMENTS

| | | | |
|---|---|---|---|
| 2,265,762 | 12/1941 | McKittrick et al. | 159/900 |
| 2,437,963 | 3/1948 | Langmuir et al. | 159/900 |
| 2,512,743 | 6/1950 | Hansell | 159/900 |
| 2,688,402 | 9/1954 | Butterworth | 159/900 |
| 2,715,390 | 8/1955 | Tenney et al. | 159/900 |
| 3,410,765 | 11/1968 | Bodine | 203/10 |
| 4,585,524 | 4/1986 | Hoiss | 203/11 |
| 4,778,535 | 10/1988 | McCord | 202/170 |
| 4,895,176 | 1/1990 | Ohtsuka et al. | 202/170 |
| 5,385,645 | 1/1995 | Li | 159/900 |

FOREIGN PATENT DOCUMENTS

| | | |
|---|---|---|
| 62-49296 | 3/1987 | Japan . |
| 4206636 | 7/1992 | Japan . |
| 7236801 | 9/1995 | Japan . |

*Primary Examiner*—Virginia Manoharan
*Attorney, Agent, or Firm*—Bacon & Thomas

[57] ABSTRACT

A distilling device has an undistilled water tank to contain undistilled water, a cover covering the tank, a water heating area communicating with the tank, a high-frequency oscillator disposed under the water heating area, a heater disposed above the water heating area, a cooling area beside the heater, and a water collecting can disposed under the cooling area. The cooling area and the water heating area are separated by a separating plate.

1 Claim, 3 Drawing Sheets

DISTILLING DEVICE

BACKGROUND OF THE INVENTION

The invention relates to a distilling device. More particularly, the invention relates to a distilling device which can produce distilled water quickly by atomizing undistilled water into fog and smog with a high-frequency oscillator, vaporizing fog and smog with a heater and cooling vapor in a cooling area.

The conventional distillator has to heat undistilled water into vapor directly. However, the process of transferring water phase into vapor phase needs a long period of time. Thus a large amount of heat energy has to be applied in order to produce distilled water.

SUMMARY OF THE INVENTION

An object of the invention is to provide a distilling device which can produce distilled water quickly with small amount of heat energy.

Accordingly, a distilling device has an undistilled water tank to containing undistilled water, a cover covering the top of the undistilled water tank, a water heating area communicating with the undistilled water tank, a high-frequency oscillator disposed under the water heating area, a heating device disposed above the water heating area, a cooling area beside the heating device, and a water collecting can disposed under the cooling area. The cooling area and the water heating area are separated by a separating plate. A reacting area is between the water heating area and the high-frequency oscillator. The high-frequency oscillator will atomize undistilled water in the water heating area into fog and smog, and the fog and smog will arise to pass through the heating device. The heating device has a plurality of transverse and longitudinal plates. A plurality of heating pipes are disposed among the plates. The heating device will vaporize the fog and smog into vapor. The vapor will enter the cooling area. Then the vapor is cooled in the cooling area and dropped down to the water collecting can. The high-frequency oscillator can transfer the undistilled water into fog and smog very fast. The heater has a plurality of plates to adsorb the fog and smog. The fog and smog can be adsorbed on the large surfaces of the plates, so the fog and smog can be transferred to the vapor instantly.

In combination, the distilling device of the present invention is unique and distinguished from the traditional distillators.

DETAILED DESCRIPTION OF THE INVENTION

Figure 1:
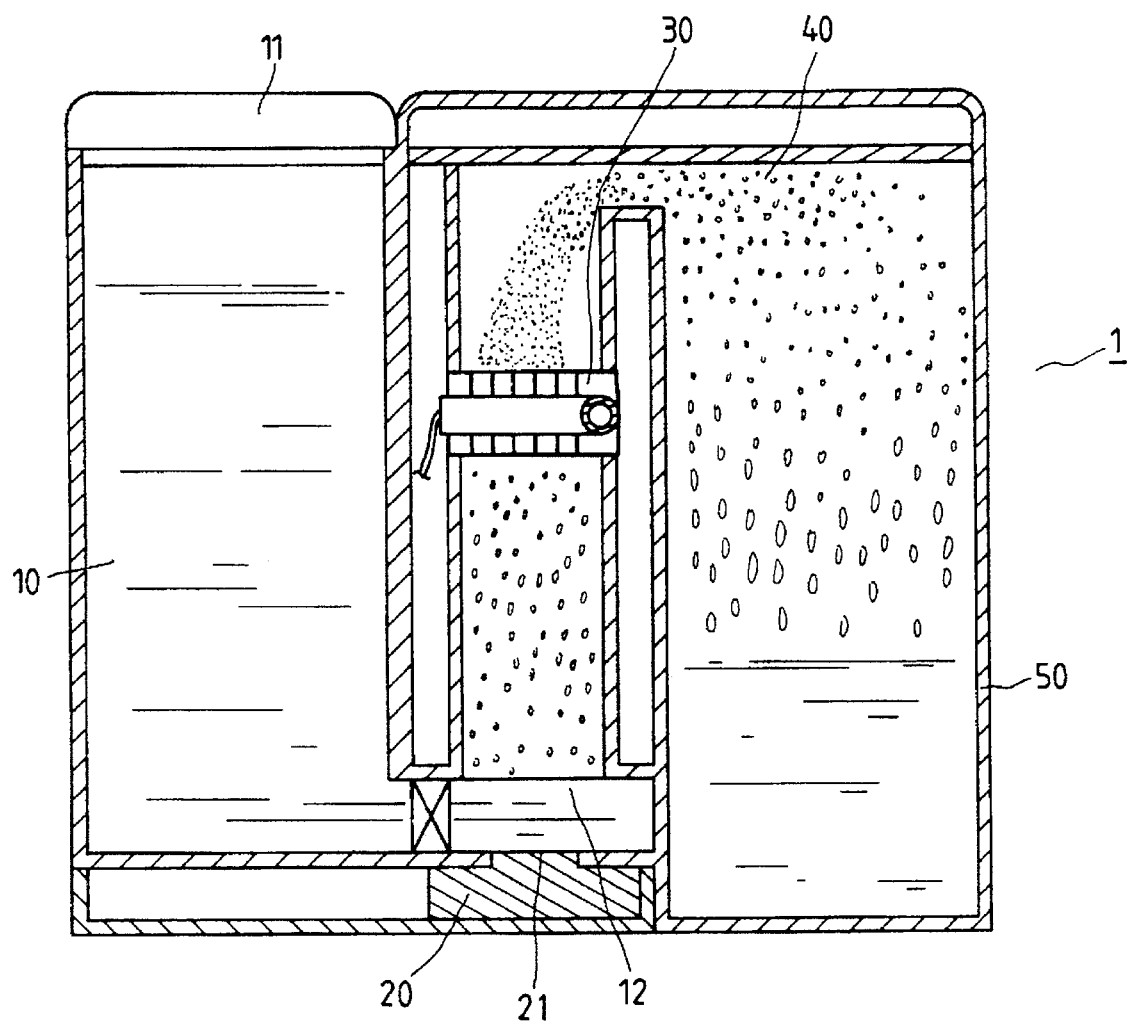
FIG. 1 is a schematic view illustrating the structure of a distilling device of a preferred embodiment in accordance with the invention.

Referring to FIG. 1, a distilling device 1 has an undistilled water tank 10 to contain undistilled water, a cover 11 covering the undistilled water tank 10, a water heating area 12 communicating with the undistilled water tank 10, a high-frequency oscillator 20 disposed under the water heating area 12, a net type heater 30 disposed above the water heating area 12, a cooling area 40 beside the net type heater 30, and a water collecting can 50 disposed under the cooling area 40. The cooling area 40 and the water heating area 12 are separated by a separating plate.

Figure 2:
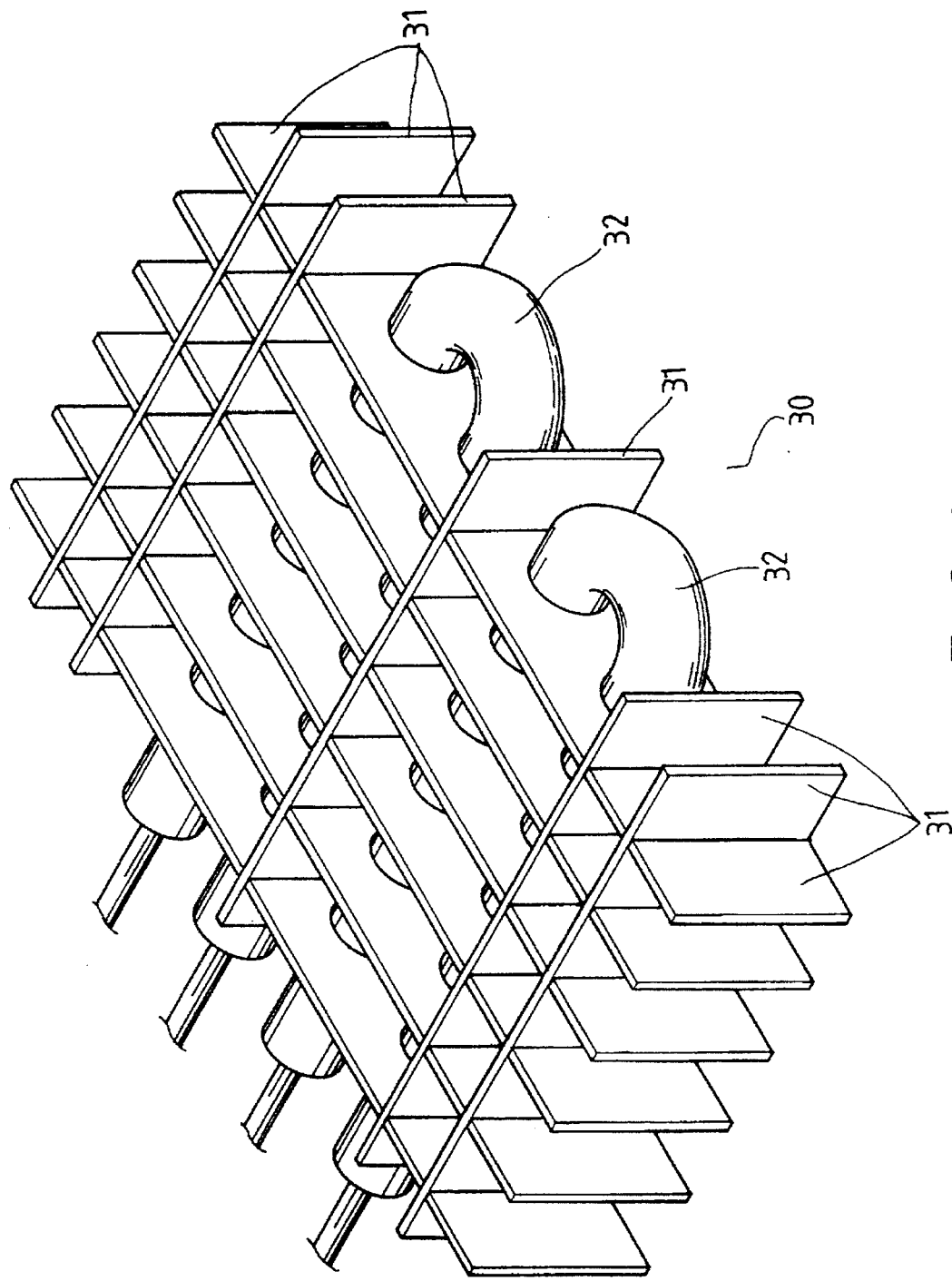
FIG. 2 is a perspective view of a net type heater.
Figure 3:
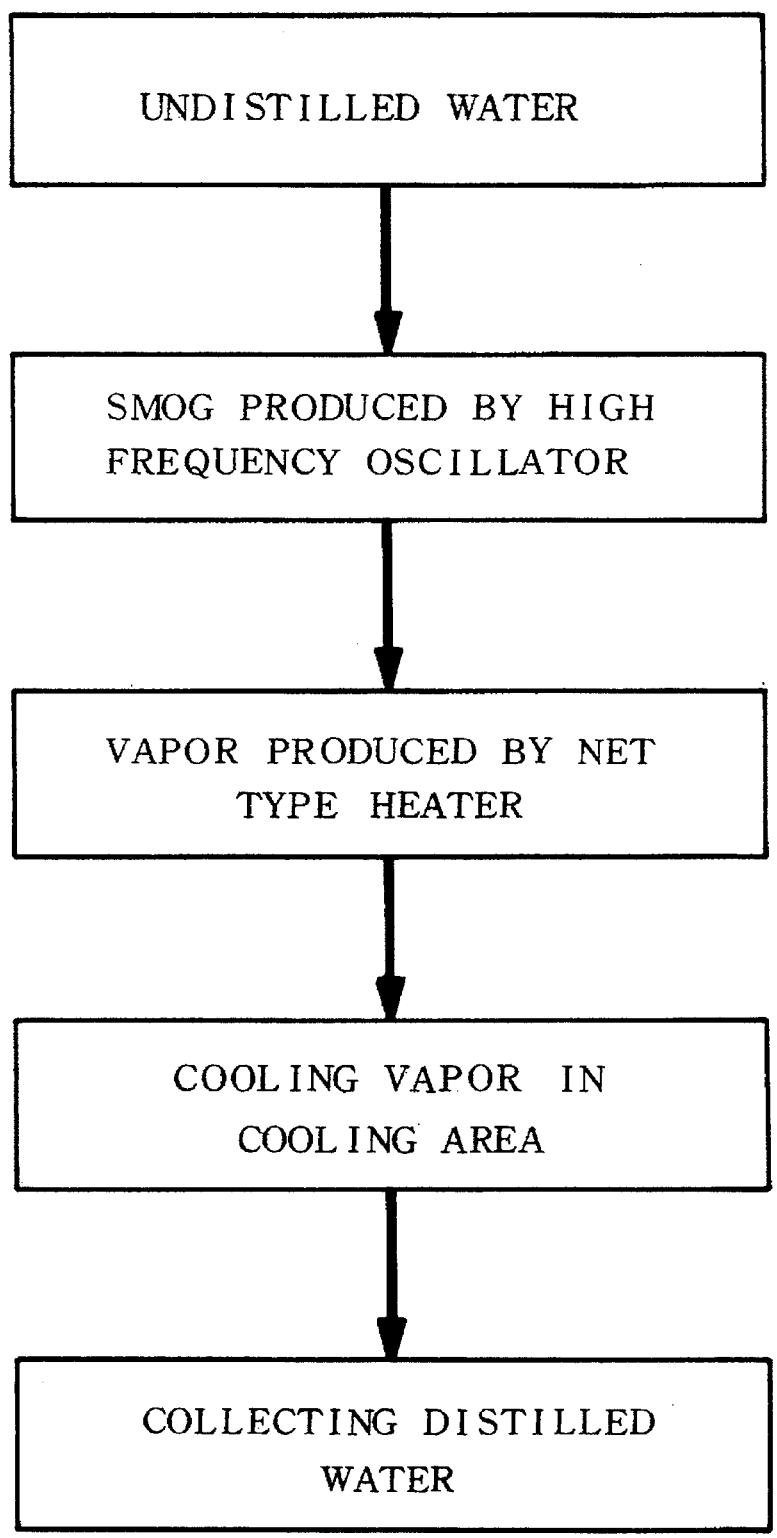
FIG. 3 is a block diagram illustrating the process of producing distilled water with the distilling device.

Referring to FIGS. 1 to 3, a reacting area 21 is between the water heating area 12 and the high-frequency oscillator 20. The high-frequency oscillator 20 will atomize undistilled water in the water heating area 12 into fog and smog, and the fog and smog will rise to pass through the net type heater 30. The net type heater 30 has a plurality of transverse and longitudinal plates 31. A plurality of heating pipes 32 are disposed among the plates. The net type heater 30 will vaporize the fog and smog into vapor. The vapor will enter the cooling area 40. Then the vapor is cooled in the cooling area 40 and dropped down to the water collecting can 50.

The major features of the present invention are the high-frequency oscillator and the net type heater. The high-frequency oscillator can transfer the undistilled water into fog and smog very fast. The net type heater has a plurality of plates to adsorb the fog and smog. Since the fog and smog can be adsorbed on the large surfaces of the plates, the fog and smog can be transferred to the vapor instantly.

The invention is not limited to the above embodiment but various modification thereof may be made. It will be understood by those skilled in the art that various changes in form and detail may be made without departing from the scope of the invention.

I claim:

1. A distilling device comprising:

a water tank containing undistilled water;

a cover covering a top of said water tank;

a first region of said water tank for heating said undistilled water;

a high-frequency oscillator disposed under said first region for atomizing said undistilled water into water particles;

a healing device disposed above said first region for heating and vaporizing said water particles, wherein said heating device has a plurality of transverse and longitudinal plates providing surfaces for adsorbing said water particles and a plurality of heating pipes are disposed among said plates to vaporize said water particles;

a second region of said water tank disposed beside said heating device for cooling water vapor formed in said heating device into drops;

a water collecting can disposed under said second region for receiving said drops; and a means for separating said first region and said second region.

* * * * *